United States Patent [19]

Seiford, Sr.

[11] Patent Number: 4,815,887

[45] Date of Patent: Mar. 28, 1989

[54] CONNECTOR WITH A LOCKING MECHANISM AND CONNECTOR BOX THEREFOR

[75] Inventor: Donald S. Seiford, Sr., Inver Grove Hts, Minn.

[73] Assignee: DS Industrial & Marine Co., Inc., St. Paul, Minn.

[21] Appl. No.: 943,106

[22] Filed: Dec. 17, 1986

[51] Int. Cl.⁴ ............................................. F16B 21/00
[52] U.S. Cl. ..................................... 403/321; 403/316; 403/338; 403/405.1; 292/218; 292/241
[58] Field of Search ................. 403/321, 323, 316, 33, 403/92, 93, 405.1, 161, 407.1, 330, 338, 292, 294, 231, 305, 268, 272, 322; 292/218, 190, 240, 241; 114/77 R, 352

[56] References Cited

U.S. PATENT DOCUMENTS

| | | | |
|---|---|---|---|
| 1,367,380 | 1/1921 | Haas | 403/92 X |
| 2,150,651 | 3/1939 | Ewing | 403/272 X |
| 2,581,816 | 1/1952 | Schlueter | 403/323 X |
| 2,703,912 | 3/1955 | Tinnerman et al. | 403/407.1 |
| 2,714,751 | 8/1955 | Stuart et al. | 403/321 X |
| 3,186,369 | 6/1965 | McLennan et al. | 114/77 R X |
| 4,160,610 | 7/1979 | Austen-Brown et al. | 403/407.1 |
| 4,295,287 | 10/1981 | Natzke et al. | 403/321 X |
| 4,507,010 | 3/1985 | Fujiya | 403/322 |

FOREIGN PATENT DOCUMENTS

| | | | |
|---|---|---|---|
| 2246699 | 1/1974 | Fed. Rep. of Germany | 403/322 |
| 2550825 | 5/1977 | Fed. Rep. of Germany | 403/322 |
| 2568956 | 2/1986 | France | 403/322 |
| 2066405 | 7/1981 | United Kingdom | 403/322 |

Primary Examiner—Andrew V. Kundrat
Assistant Examiner—Peter M. Cuono
Attorney, Agent, or Firm—Edwin E. Greigg

[57] ABSTRACT

A connector with a locking mechanism and a connector box therefor. The connector box is made with one side for a connector element and the opposite side includes a holding element. Therefore, connector boxes are secured in a device to be secured together so that the connector boxed are oppositely disposed. A connector element is secured in each connector box and rotated to cooperate with the oppositely disposed holding element to secure the two devices together.

4 Claims, 2 Drawing Sheets

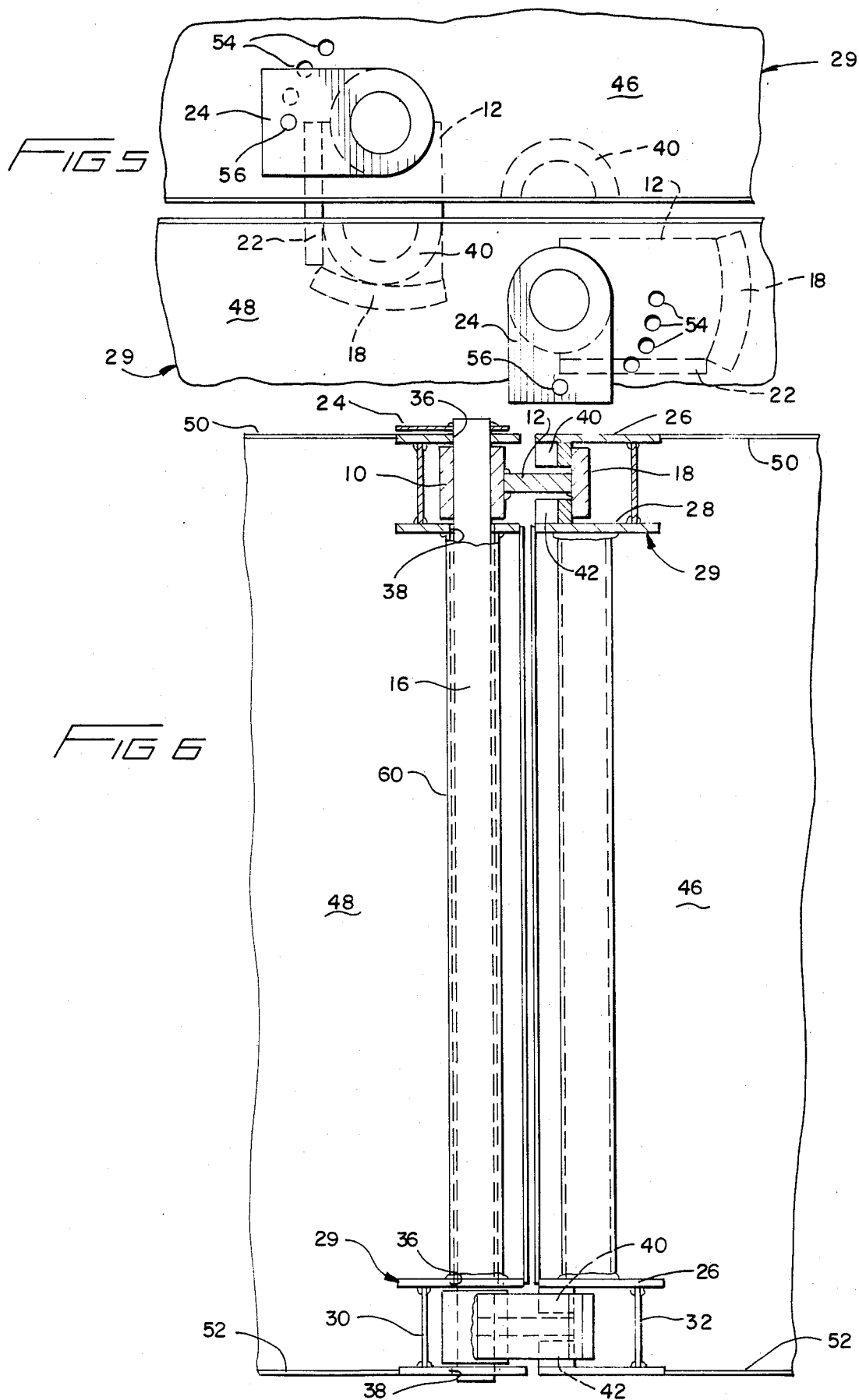

CONNECTOR WITH A LOCKING MECHANISM AND CONNECTOR BOX THEREFOR

The present invention relates to connectors and more particularly to connectors and connector boxes for assembling two structures side-by-side or end-to-end.

Connectors such as set forth herein may be used for connecting pontoons, floating docks, waterborne bridge sections, barges or any other structure requiring two sections to be secured tightly together side-by-side or end-to-end.

Heretofore, different connectors have been used for connecting barges, etc., together. Such connectors make use of separate parts which are easily dropped or lost which creates a problem during assembly. U.S. Pat. No. 2,518,091 sets forth some of the features of this invention. However, there are drawbacks during assembly of the elements set forth in the patent.

Heretofore, connector systems for use on barges and the like have required multiple elements to be used so that there was the possibility of error or confusion when installing the fittings between right and left hand elements, male and female elements, and other dual element applications.

In carrying out the teaching of the present invention for use in connecting two barges together, there are no protrusions on the exposed sides of the barge, the device has an eccentric movement which draws the barges close together, it has only one moving part for each connector, it has a built-in locking feature, it is easily adapted to existing barges, it is built for strength and it has built-in mating features.

OBJECT AND SUMMARY OF THE INVENTION

It is a principal object of the invention to provide a single element universal connector to avoid the previous techniques which required at least two different types of connector fitting.

It is a further object of the invention to provide a single element connector assembly for retro-fittable application to existing barges.

It is still another object of this invention to provide a connector with a locking mechanism which is adapted to easily secure two elements together in a tight, close relationship end-to-end or side-to-side.

Yet another object is to provide a connector which will secure two elements together without any protruding parts beyond the sides or ends of the elements.

Still another object is to provide a connector which avoids open recesses in the top surface of the element at the connector.

Other and further objects and advantages of this invention will become obvious from the following detailed description.

BRIEF DESCRIPTION OF THE DRAWINGS

FIG. 5 is a view from the upper surface of side-by-side elements to be connected together showing one connector element in the open position and one connector in the closed position; and FIG. 6 is a partial cross sectional view of a connector connecting two barges together end to end showing an upper and lower connection.

DETAILED DESCRIPTION

Figure 1:
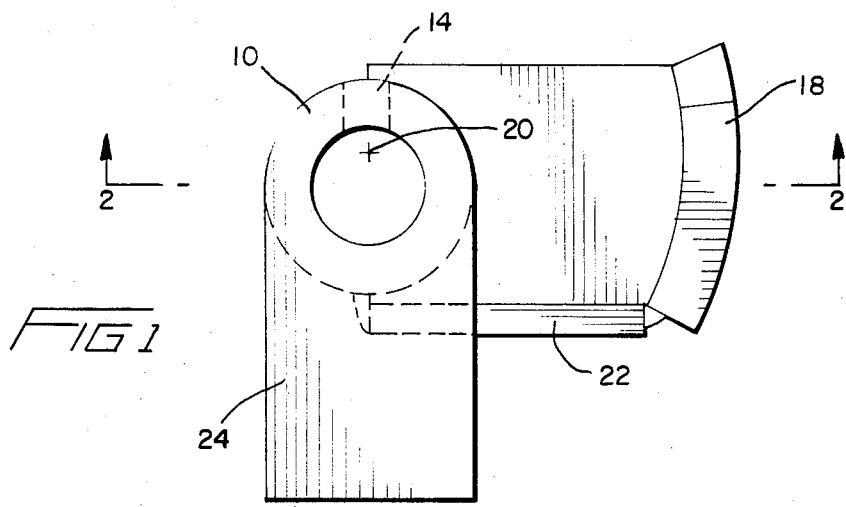
FIG. 1 is a top view of the connector.
Figure 2:
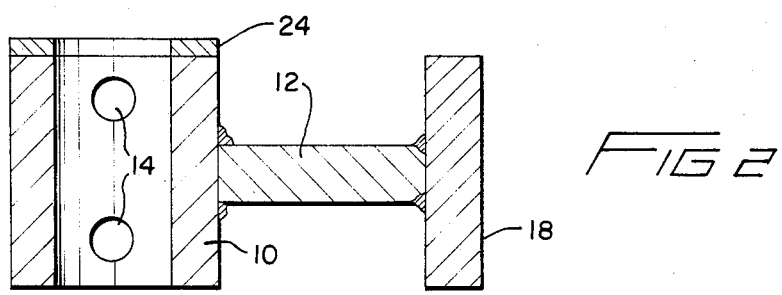
FIG. 2 is a cross sectional view of FIG. 1 along line 2—2.

Now referring to the drawings there is shown in FIGS. 1 and 2 a top and cross-sectional view of a connector showing a cylindrical body 10, to which an outwardly extending horizontal arm 12 is secured to the mid-section of the body 10. The body 10 is provided with spaced apertures 14 which are provided for plug welds for securing the connector to a rod or shaft 16 that extends through the body when in use. A vertical curved end plate 18 having a center 20 offset with respect to the center of the body 10 is secured to the end of the horizontal arm 12 so that the vertical end plate is eccentric with respect to the center of the body 10. A vertical mating bar 22 is secured to the outer surface of the cylindrical body 10 along its center line and to one end of the curved end plate. A locking arm 24 may be secured to the upper surface of the cylindrical body 10 or to the rod to which the cylindrical body is secured so that as the locking arm is rotated the cylindrical body will also rotate. The locking arm is provided with one or more apertures through which a locking pin, not shown may be inserted to lock the connector in place when in use.

Figure 3:
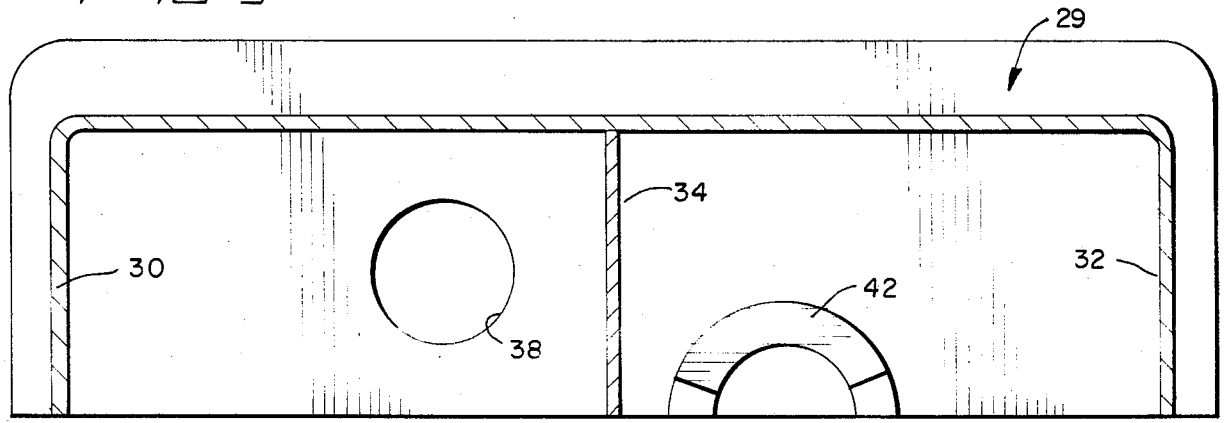
FIG. 3 is a view of a connector box with the top portion removed looking at the bottom inside of the connector box.
Figure 4:
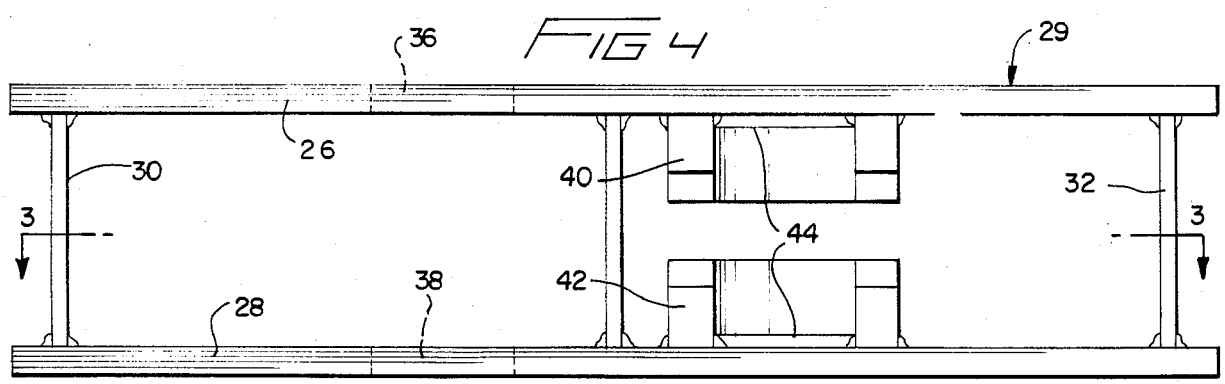
FIG. 4 is a side view of the connector box.

The connector will be explained in use to secure two barges in end-to-end or side-by-side positions as shown in FIGS. 5 and 6, with the connector and connection box shown in FIGS. 1-4. The connector box is shown in FIGS. 3 and 4. FIG. 3 is a view of a connector box 29 with the top removed looking into the inside of the bottom. As shown, the connector box includes a top 26 and a bottom 28, with ends 30, 32 and a supporting mid-wall 34. The top and bottom walls are provided with axially aligned apertures 36, 38 and oppositely disposed spaced semi-cylindrical supports 40 and 42 each of which are secured to the upper and bottom surfaces, respectively as by welding at 44. The semi-cylindrical supports are secured such that their diametrical faces are along the edge of the connector box surface. The apertures 36 and 38 are on a center line from front to back with their centers the same distance from the supporting mid-wall as the center line of the cylindrical supports.

FIGS. 5 and 6 illustrate two barges 46 and 48 with connector boxes 29 secured within corresponding positions within recesses in the surfaces of the two barges. The upper surface of the connector boxes are secured to the upper surfaces 50 of the barges and in alignment therewith and the bottom surfaces of the connectors secured on the bottom of the barges are secured in alignment with the bottom surface 52 of the barges. On one side of FIG. 5 the connector is shown in its closed position with the curved end plate rotated in place so that the curved end plate is behind the holder 40. Since the curved end plate has a center which is off-set relative to the center of the connector body, the connector has a camming action to draw the two barges closer together as the connector is rotated by the locking arm 24. The upper surface of the connector box is provided with spaced holes 54 which align with a hole 56 in the arm 24. A pin, not shown, is inserted into the hole 56 and into one of the holes 54 in order to lock the connector locking arm in place. The vertical mating bar 22 functions as a stop during rotation of the connector to its locking position and also functions to add strength between the connector body 10 and the curved end plate 18.

FIG. 6 illustrates two barges 46 and 48 secured together by use of connectors made in accordance with this invention. In assembly, the upper and bottom connectors are placed within the connector box within the side having the apertures 36 and 38. The rod 16 is then pushed from one side through the connector, through the cylinder 60 in the barge between the connectors through the other connector with the end of the rod 16 extending through each of the connectors and connector boxes. Each of the connectors are secured to the rod as by welding through the weld holes. The arm 24 is then welded to the rod at a 90° angle relative to the vertical mating bar. At this time the connector will be in its open position, as shown on the right side of FIG. 5. The locking connector can be assembled in place at the time the barge is made or at such time that it is out of the water. Of course, it is possible to assemble while the barge is in the water but would require an under water welder. The two barges are brought together end-to-end or side-to-side and the connectors are rotated 90° to lock the two barges together as shown in the left side of FIG. 5 and in FIG. 6.

In locking two barges together two connectors are used for each connector box. That is, one connector will be assembled in each oppositely disposed connector box on each barge for connecting the barges together. Since the connector boxes will be facing each other the connector side of each facing connector will be opposite the supporting elements of the opposite connector box. Therefore, the connectors on each barge of oppositely disposed connector boxes will be secured to connector supports 40, 42 of the opposing connector box.

It will be obvious that only one pair of oppositely disposed connector boxes can be used to hold two elements together. Thus, connectors such as shown at the upper portion of the barges in FIG. 6 would be used. Further, for light duty, only one connector element would be necessary such as one-half of the connector box as shown in either side of the FIG. 5.

The foregoing relates to a preferred exemplary embodiment of the invention, it being understood that other variants and embodiments thereof are possible within the spirit and scope of the invention the latter being defined by the appended claims.

What is claimed and desired to be secured by letters patent of the United States is:

1. A connector for use with a connector box, which comprises
   a cylindrical body having an axial aperture of one diameter and a longitudinal axis,
   a flat plate secured at one end to said cylindrical body at about its mid-section such that a plane through said plate is perpendicular to the longitudinal axis of said cylindrical body,
   a curved end plate secured along one surface thereof to said plate with said end plate having a length extending in a direction of the axis of said cylindrical body, said curved end plate has a center of curvature which is offset with respect to said longitudinal axis of said cylindrical body,
   a mating bar secured at one end to an outer surface of said cylindrical body along the center line thereof, said mating bar extends to said curved end plate and is secured to an end of said curved end plate, said cylindrical body includes apertures for weld plugs to weld said connector to a shaft,
   a locking arm connected to one end of said cylindrical body for rotating said connector in order to lock said connector to a supporting means and said locking arm includes at least one aperture therein for locking said arm and said connector in place.

2. In combination, a connector and a connector box, in which:
   said connector box includes spaced upper and lower substantially parallel walls, a central wall and end walls between said upper and lower walls that form first and second sections, in said connector box,
   oppositely disposed axially aligned apertures in said upper and lower walls of said first section, said axially aligned apertures having aligned centers equally spaced from said central wall,
   oppositely disposed axially spaced semi-cylindrical support elements secured to said upper and lower walls in said second section, each of said semi-cylindrical support elements being spaced equidistant from said center wall with a plane parallel to said central wall extending through their center equal to the aligned center spacing of said aligned apertures in said upper and lower walls from said central wall,
   a connector in said first section secured to a shaft that extends through said axially aligned apertures,
   said connector including a cylindrical body having an axial aperture of one diameter and a longitudinal axis,
   a flat plate secured at one end to said cylindrical body at about its mid-section such that a plane through said plate is perpendicular to the longitudinal axis of said cylindrical body,
   a curved end plate secured along one surface thereof to said plate with said end plate having a length extending in a direction of the axis of said cylindrical body, said curved end plate has a center of curvature which is offset with respect to said longitudinal axis of said cylindrical body,
   a mating bar secured at one end to an outer surface of said cylindrical body along the center line thereof, said mating bar extends to said curved end plate and is secured to an end of said curved end plate, said cylindrical body includes apertures for weld plugs to weld said connector to a shaft,
   a locking arm connected to one end of said cylindrical body for rotating said connector in order to lock said connector to a supporting means and said locking arm includes at least one aperture therein for locking said arm and said connector in place.

3. A connector as set forth in claim 2 in which said upper wall of said connector box includes a plurality of aligned apertures which align with said at least one aperture in said locking arm.

4. A connector box in which a connector is secured for locking two devices together, which comprises:
   parallel upper and lower walls;
   a central wall and end walls between said upper and lower walls that form first and second sections;
   oppositely disposed axially aligned apertures in said first section in said upper and lower walls, said axially aligned apertures having aligned centers equally spaced from said central wall; and
   oppositely disposed axially spaced semi-cylindrical support elements fixed on said upper and lower walls in said second section, each of said semi-cylindrical support elements being spaced equidistant from said central wall with a plane parallel with said central wall extending through their center equal to the aligned center spacing of said axially aligned apertures in said upper and lower walls from said central wall, and said semicylindrical supports are secured to said upper and lower walls with their diametrical faces along the edges of said upper and lower walls.

* * * * *